W. LINTON, dec'd.
ELIZABETH LINTON, Adm'x.
Machine for Molding Pottery.
No. 6,425. Reissued May 11, 1875.
—FIG. I.—
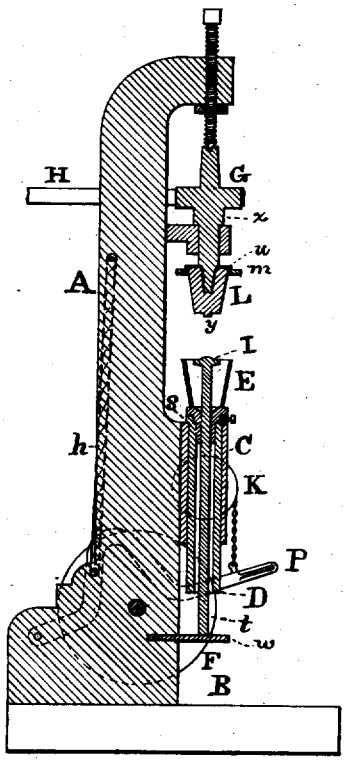
—FIG. II.—
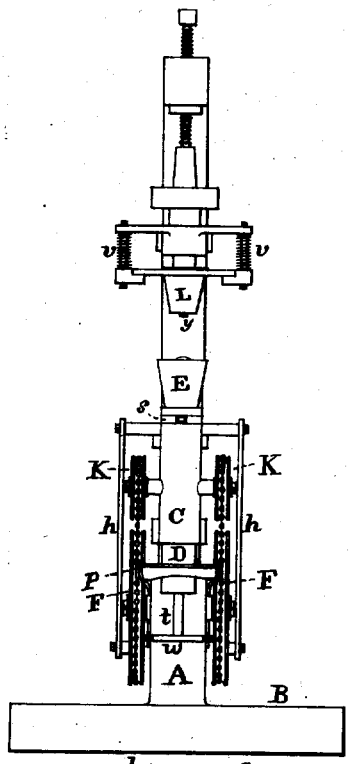
—FIG. III.—
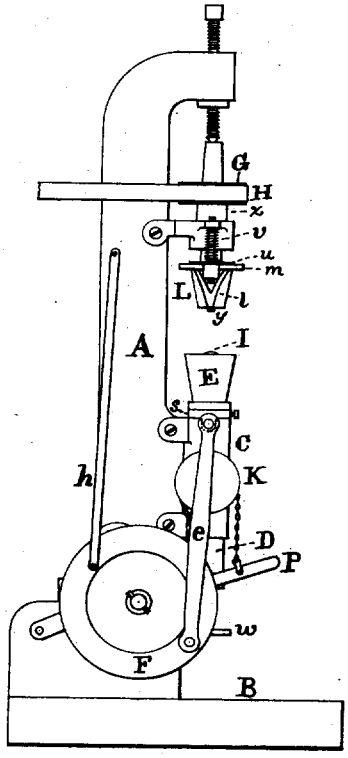
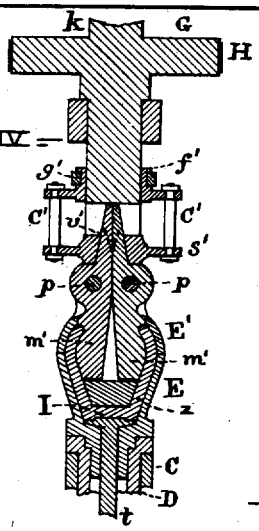
—FIG. IV.—
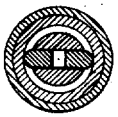
—FIG. VI.—
—FIG. V.—
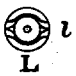
—WITNESSES—
H. A. Daniels
W. S. Chase
—INVENTOR—
William Linton, by
Elizabeth Linton, adm^x.
by W. T. Howard,
Attorney.
THE GRAPHIC CO. PHOTO-LITH. 39 & 41 PARK PLACE, N.Y.

UNITED STATES PATENT OFFICE.

ELIZABETH LINTON, OF BALTIMORE, MARYLAND, ADMINISTRATRIX OF WILLIAM LINTON, DECEASED.

IMPROVEMENT IN MACHINES FOR MOLDING POTTERY.

Specification forming part of Letters Patent No. 31,394, dated February 12, 1861; extended seven years; reissue No. 6,425, dated May 11, 1875; application filed April 26, 1875.

*To all whom it may concern:*

Be it known that WILLIAM LINTON, formerly of the city of Baltimore, in the State of Maryland, deceased, invented certain Improvements in Machinery for Molding Pottery-Ware, Crucibles, and other articles, of which the following is a specification:

This invention relates to machinery for molding articles of pottery-ware; and consists in certain improvements in the construction thereof, as hereinafter shown and described, reference being had to the accompanying drawing forming a part of the specification herein, in which—

Figure 1 is a longitudinal section of the machine. Fig. 2 is a front view of the same. Fig. 3 is a side view of the same. Figs. 4, 5, and 6 are detailed views of parts of the machine, as hereinafter more particularly described.

Similar letters of reference indicate similar parts in all the views.

A designates the upright frame of the machine, secured to the base B, which is held to the floor by bolts. On the front edge of this upright is secured, by means of bolts and flanges or lugs, the guiding-tube C, into which is fitted the slider D, consisting also of a tube, having on its top end a projecting fillet or band, *s*, upon which it rests on the top of the guiding-tube C when at its lowest position. E is the exterior mold or matrix, within which the article is formed, its interior corresponding with the exterior shape of the proposed article. The matrix E fits into the top of the slider D, and rests upon a shoulder on its outside, and is secured by set-screws. The bottom of the matrix E is a circular plate or disk, I, which is attached to the rod or starter *t*. L is the core or interior mold, which is caused to rotate rapidly on its axis by means of the pulley G and its belt.

The remaining parts of the machine will be better understood by describing the process of molding an article of pottery-ware—as, for instance, a flower-pot—by it. A piece of clay of the quantity required for the proposed article, and of the proper temper for working, is placed on the disk or bottom plate I. The foot of the operator is then pressed on the treadle P, which acts on the wheels F by means of the chains passing over the pulleys K, and attached to the wheels F, and also to the treadle. A partial revolution of the pulleys and an upward motion of the slider D are thus caused. By means of connecting-rods *e*, the lower ends of which work on pins affixed to the wheels F, and the upper ends on pins attached to the slider D, it is seen that the revolving movement of the said wheels imparts a vertical motion to the slider. Springs of caoutchouc are represented by *h*, for the purpose of bringing or drawing the pulleys F, and consequently the slider D, back to their original position. When the treadle is relieved from foot-pressure, the action of the said caoutchouc springs produces this result. The slider D carries on its top or upper end the exterior mold E, which, as it rises, also carries the bottom disk I with it, first causing it to take its proper seat in the bottom of the matrix. In the meantime the clay or material to be operated upon simply occupies the bottom of the cavity of the matrix; but the slider continuing to ascend, the mold E will finally inclose the revolving core-mold L and complete the operation, the surplus material, if there be any, being forced out over the edge of the exterior mold E. In this position of the machine, the lip-mold *m* is forced into contact with the rib or projection *u* on the core-mold L, thus compressing the spiral springs *v*, the lip-mold *m* playing loosely on the mold L. When all the parts of the mold are thus brought into coaptation the process of molding is completed, and the removal of the foot-pressure from the treadle P opens the mold and presents the article ready to be lifted off and placed upon the drying-shelf; but in the process of separating the mold from the articles which are necessarily in a soft state, the adhesiveness of the clay and the pressure of the atmosphere present difficulties which must be overcome. The adhesion of the clay to the mold may be overcome by using a very minute quantity of oil; but this in no way relieves the atmospheric pressure in withdrawing the core-mold.

This difficulty is avoided by the use of the following device, which perfectly answers the purpose: Three pairs of shallow channels are provided in the conical face of the core-mold L, in the manner represented at *l*, Figs. 3 and 5. These start from three points at the upper part of the mold, and meet in three intermediate points in the lower part, at which parts the channels are deepest, and give a slightly trefoil appearance to the bottom of the mold, the channels affording a free passage for the admission of air into the cavity of the ware on withdrawing the core-mold.

This form of core-mold also imparts greater solidity to the ware, for its projecting members knead the material in the mold, while its channels afford free exit to the air. The instant the pressure is removed from the foot-lever P the springs *v* force the newly-formed article down off the core-mold. Thus liberated from the core-mold it passes down with the matrix E till the foot of the rod *t* strikes the bracket *w*, attached to the upright A, when it stops, bringing to rest also the article which has been molded; but the exterior mold or matrix, continuing to descend, completely strips the article and leaves it resting on the disk I, ready for removal to the drying-shelf, as before stated.

In the foregoing illustration of the operation of the machine the molding of a flower-pot is contemplated, and as the bottoms of these articles are perforated, the perforation thereof is effected in the following manner: A punch, *y*, is placed on the bottom of the core-mold L, which punch, as the outer mold or matrix is caused to inclose the core-mold, punches out the clay to an extent equal to its size, thus making the perforation. The core-mold is made of metal, and is screwed onto the shaft or spindle *x*, so that it can be removed or replaced at pleasure.

Fig. 4 is a vertical section of an expanding core-mold, matrix, portion of the revolving shaft, and of a pot formed by the molds. G is the pulley on the shaft *k*, and is revolved by the belt H. E is the lower part of the external mold or matrix, fastened to the slider D, as hereinbefore described, and shown in Figs. 1, 2, and 3, a horizontal section of the matrix, core-mold, and pot, through their greatest diameters, being shown in Fig. 6. E′ is the upper part of the external mold, which is of one piece with the shaft K, the shaft being mortised or slotted for the reception of the expanding parts of the core-mold, which are marked *m′*, and work on pins *p* as centers. These pins pass through the levers *m′* and shaft *k*. A spring is represented by *v′*, for the purpose of bringing the lower portions of the levers *m′* together when the socket *s′* is raised by the clutch *f′*. A section of the fork of the clutch only is shown in the drawing, operating on the grooved collar *g′*, connected to the socket *s′* by the stems C′. The upper and outward surfaces of the levers *m′* are made tapering or beveling, so that when the socket *s′* is depressed the lower parts of the levers are expanded to the position shown in Fig. 4, and when said socket is raised the upper parts are separated, and the lower parts brought together by the action of the spring *v′*. The pot or crucible is represented by *z*. The parts A, C, D, E, and I are similar to, and operate in the same manner.

The following is claimed herein:

1. The combination of a core-mold or male former, having a punch-point, with a matrix or female former, having a vertically-adjustable bottom, the said core-mold and matrix being adapted to be brought together, so as to form pottery articles within the space existing between the outer and inner surfaces of the said core-mold and matrix, and the newly-formed article to be lifted out from the matrix, substantially as herein specified.

2. The combination of the matrix E, slider D, suitably supported and guided in its up-and-down movement, rod *t*, and disk I, substantially as and for the purposes specified.

3. The revolving core-mold, in combination with the stationary, yielding, or traversing lip-mold or top molder, operated by springs, so as to hold the vessel formed in the mold when the core is removed, substantially as described.

4. The core-mold grooved out or provided with air-channels, substantially as and for the purpose specified.

5. The punch-pointed core-mold, combined with the raising bottom I of the external mold or matrix E, substantially as herein set forth.

6. The method of forming flower-pots by drawing together a revolving and a stationary former or mold, simultaneously inclosing the clay in the space between the molds and punching out the bottom of the pot, substantially as herein specified.

In testimony whereof, ELIZABETH LINTON, administratrix of the said WILLIAM LINTON, has subscribed her name hereto in the presence of two subscribing witnesses.

ELIZABETH LINTON.

Witnesses:

WM. T. HOWARD,

BENJ. EGGLESTON.